UNITED STATES PATENT OFFICE.

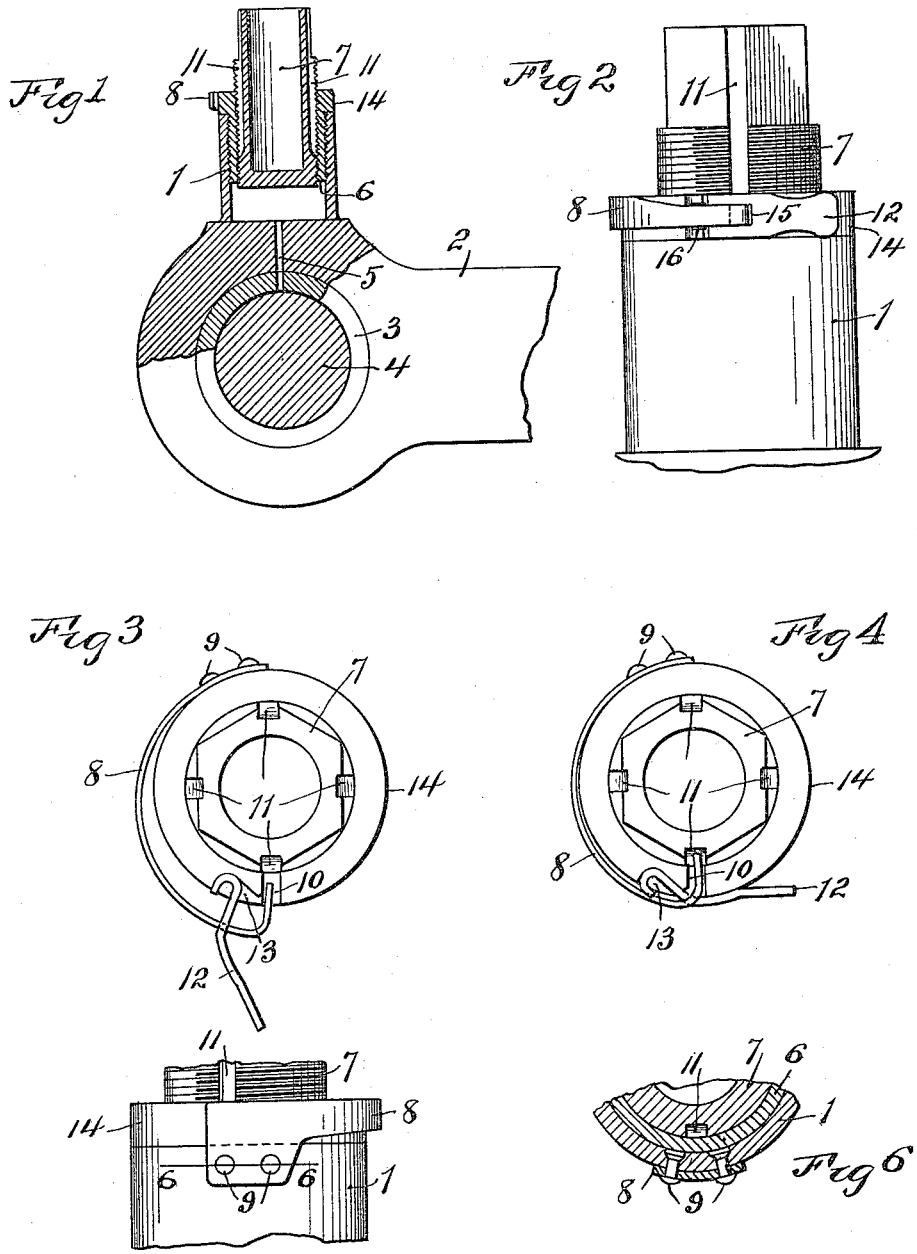

ROBERT B. GREENWAY, OF SAN BERNARDINO, CALIFORNIA.

GREASE-CUP.

1,169,477.   Specification of Letters Patent.   Patented Jan. 25, 1916.

Application filed April 15, 1915. Serial No. 21,516.

*To all whom it may concern:*

Be it known that I, ROBERT B. GREENWAY, a citizen of the United States, residing at San Bernardino, in the county of San Bernardino and State of California, have invented a certain new and useful Improvement in Grease-Cups, of which the following is a specification.

My invention relates to improvements in grease cups.

It relates particularly to the type of grease cups of the type provided with an outer shell, adapted to be secured to a moving part of machinery, such as the side rod of a locomotive, the shell having fitted in it a bushing in which is mounted a screw plug for forcing the grease from the shell.

The object of my invention is to provide novel means for releasably locking the plug to the bushing and the bushing to the shell, so that the plug and bushing can not work loose by vibration and become lost.

The novel features of my invention are hereinafter fully described and claimed.

In the accompanying drawings, which illustrate the preferred embodiment of my invention, Figure 1 is a vertical sectional view of my improved grease cup shown mounted on the side rod of a locomotive, the side rod and parts connected therewith being shown partly in section and partly in side elevation. Fig. 2 is a side elevation of the grease cup and a portion of the side rod. Fig. 3 is a top view of the grease cup, with the spring shown withdrawn by the lever from the groove in the plug. Fig. 4 is a top view of the grease cup, with the spring being shown disposed in one of the grooves in the plug. Fig. 5 is a fragmental side elevation of the grease cup looking at the side to which the spring is secured. Fig. 6 is a horizontal section on the line 6—6 of Fig. 5.

Similar reference characters designate similar parts in the different views.

1 designates an outer shell comprising a tube which is internally screw threaded from its upper end downwardly, the lower end being adapted to be secured by brazing, or otherwise, to a moving part of machinery, such as a side rod 2 of a locomotive, the side rod being provided with a bushing 3 in which is fitted the crank pin 4. A hole 5 extends through the bushing 3 and upper portion of the side rod 2, the upper end of the hole communicating with the interior of the shell 1.

Fitted in the threaded upper end of the shell 1 is an internally and externally threaded bushing 6, which with the shell 1 forms a casing. An externally threaded plug 7 is fitted in and is adapted to extend through the bushing 6, and has, preferably a polygonal upper projecting end adapted to be gripped by a wrench. By turning the plug 7 in the proper direction the grease in the shell 1 may be forced therefrom through the hole 5 and against the crank pin 4.

For releasably holding the plug 7 and bushing 6 from being accidentally turned, by vibration or pounding of the side rod 2, there is provided an arcuate spring 8 having one end secured, as by rivets 9, to the periphery of the shell 1. The bushing 6 is provided with a transverse slot 10 in which normally extends the inwardly turned free end of the spring 8, which is adapted to enter any one of one or more longitudinal peripheral grooves 11 in the plug 7. The tension of the spring 8 normally forces it to the position shown in Fig. 4, in which position one of the grooves 11 will register with the slot 10. The spring will thus hold the plug 7 and bushing 6 from being turned. The grooves 11 do not extend to the lower end of the plug 7, but they may, as shown extend to the upper end of the plug.

For withdrawing the free end of the spring 8 from a groove 11, a lever 12 may be provided, the inner end of the lever being, preferably, rounded and fitted in a recess 13 provided in the periphery of the bushing 6 in that portion comprising an annular flange 14 at the upper end of the bushing, and which is adapted to rest upon the upper end of the shell 1.

In order that the lever 12 may be held normally seated in the recess 13 in which it is fulcrumed, suitable means may be provided for interlocking the lever and spring 8. The means for effecting this function shown in the drawing comprise a slot 15 in the lever 12, through which the spring extends, and a notch 16 in the outer side of the fulcrumed end of the lever. When in the closed position, shown in Fig. 4, the spring 8 enters the notch 16, Fig. 2, and the tension of the spring holds the lever firmly in such position.

In operating my invention to turn the plug 7, it is but necessary first to swing the lever 12 from the position shown in Fig. 4 to that shown in Fig. 3. In the latter position the spring 8 will be withdrawn from the groove 11 adjacent thereto, so that the plug may be turned in either direction. When the plug has been adjusted to the desired position, the lever is released, thereby permitting the spring 8 to enter the adjacent groove 11, if such groove is in register with the slot 10, and if such registration has not been effected, the plug may be turned until the spring will enter one of the grooves.

As the spring is always located in the slot 10, the bushing 6 can not be accidentally turned. If it is desired to remove the bushing 6, this may be done by withdrawing, by hand, the free end of the spring 8 from the slot 10, and then turning the bushing in the proper direction.

I do not limit my invention to the structure shown and described, as modifications, within the scope of the appended claims, may be made without departing from the spirit of my invention.

What I claim is:—

1. In a grease cup, an outer internally screw-threaded shell, an internally and externally threaded bushing fitted in said shell and provided with a transverse slot, a screw-threaded plug fitted in said bushing and provided with a longitudinal groove, and a spring having one end secured to said shell and having a free end normally extending into said slot and adapted to be normally forced by its tension into said groove when the groove is in register with said slot.

2. In a grease cup, an outer internally screw-threaded shell, an internally and externally threaded bushing fitted in said shell and provided with a transverse slot, a screw-threaded plug fitted in said bushing and provided with a longitudinal groove, a spring having one end secured to said shell and having a free end extending into said slot and adapted to be normally forced by its tension into said groove when the groove registers with said slot, and a lever fulcrumed on said bushing and engaging said spring and adapted to withdraw said spring from said groove.

3. In a grease cup, an outer internally screw-threaded shell, an internally and externally threaded bushing fitted in said shell and provided with a transverse slot, a screw-threaded plug fitted in said bushing and having a longitudinal groove, a lever fulcrumed on said bushing and having a slot, and a spring having one end secured to said shell and extending through and slidable in said slot in said lever and having its free end extending into the slot of the bushing and adapted to enter said groove when the groove registers with the slot in the bushing, the lever being adapted, when swung, to withdraw the spring from said groove.

4. In a grease cup, an outer internally screw-threaded shell, an internally and externally threaded bushing fitted in said shell and having a transverse slot, a screw-threaded plug fitted in said bushing and having a longitudinal groove adapted to register with said slot, a lever fulcrumed on said bushing, and a spring having one end secured to said shell and having a free end extending into said slot and adapted to enter said groove and adapted to be withdrawn from said groove by said lever, the tension of said spring normally forcing it into said groove, the spring being interlocked with said lever so as to retain the lever fulcrumed on the bushing.

5. In a grease cup, an outer internally screw-threaded shell, an internally and externally threaded bushing fitted in said shell and having a transverse slot and a peripheral recess, a screw-threaded plug fitted in said bushing and having a longitudinal groove adapted to register with said slot, a lever fulcrumed in said recess, and a spring secured to said shell and interlocking with said lever so as to retain said lever fulcrumed in said recess, the spring having a free end normally extending into said slot and adapted to enter said groove, the tension of the spring normally forcing it into said groove, the lever being adapted to withdraw the spring from said groove.

6. In a grease cup, an outer internally screw-threaded shell, an internally and externally threaded bushing fitted in said shell and having a transverse slot and a peripheral recess, a screw-threaded plug fitted in said bushing and having a longitudinal groove adapted to register with said slot, a lever fulcrumed in said recess and having a slot, a spring secured to said shell and extending through and slidable in the slot of said lever and having a free end adapted to be normally forced by the tension of the spring into said groove and adapted to be withdrawn from said groove by said lever.

7. In a grease cup, an internally screw threaded casing having a transverse slot, a screw threaded plug fitted in said casing and having a longitudinal peripheral groove, a spring secured to said casing and having a free end extending through said slot and adapted to be forced by the tension of the spring into said groove when the groove registers with the slot, and a lever fulcrumed on the casing and engaging the spring and adapted, when swung in the proper direction to withdraw the spring from said groove.

8. In a grease cup, an internally screw threaded casing having a transverse slot, a screw threaded plug fitted in said casing and having a longitudinal groove, a spring secured to said casing and having a free end extending through said slot and adapted to be forced by the tension of the spring into said groove, when the groove registers with the slot, and a lever fulcrumed on the casing and having a slot through which the spring extends, and adapted, when swung in the proper direction to withdraw the spring from said groove.

9. In a grease cup, an outer shell, a bushing having threaded engagement with the outer shell, a plug having threaded engagement with the bushing and extending into said outer shell, and means secured to the outer shell for releasably holding the bushing and plug from turning.

10. In a grease cup, an outer shell, a bushing having threaded engagement therewith, a plug having threaded engagement with the bushing and extending into the shell, and a spring secured to the outer shell and having means for releasably engaging the bushing and plug for holding the bushing and plug from turning.

In testimony whereof I have signed my name to this specification in presence of two subscribing witnesses.

ROBERT B. GREENWAY.

Witnesses:
HARRY M. GREEN,
H. W. PHIPPS.

Copies of this patent may be obtained for five cents each, by addressing the "Commissioner of Patents, Washington, D. C."